Patented Apr. 23, 1929.

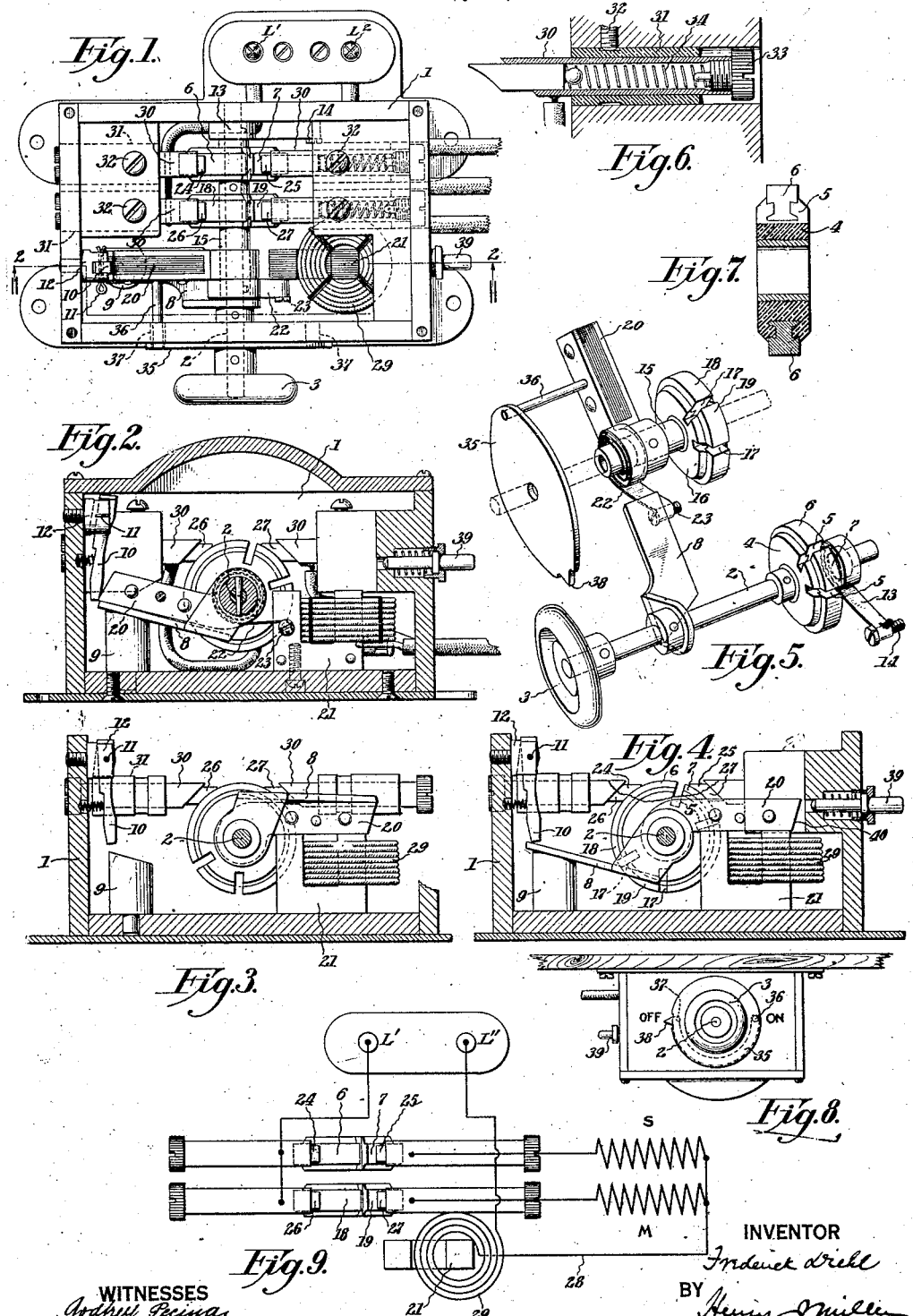

1,709,935

UNITED STATES PATENT OFFICE.

FREDERICK DIEHL, OF ELIZABETH, NEW JERSEY, ASSIGNOR TO DIEHL MANUFACTURING COMPANY, OF ELIZABETH, NEW JERSEY, A CORPORATION OF NEW JERSEY.

STARTING DEVICE FOR ELECTRIC MOTORS.

Application filed July 21, 1923. Serial No. 652,380.

This invention relates to controlling or starting devices for electric motors and is more particularly intended for use in connection with single-phase induction motors having a starting winding which is designed to be cut out of circuit as soon as the motor has attained running speed.

To overcome the well known inability of a single phase induction motor to start from rest, it is usual to provide, in addition to the main single-phase running winding, a starting winding wherein the phase of the current is caused to differ from that in the main winding by any suitable means. The phase difference in the currents in the two windings produces the necessary rotating magnetic field causing the motor to start from rest. As the starting winding is only intended to carry current for the short time necessary to start the motor, it is composed of wire of smaller size than would be necessary were it intended to operate for longer periods. If the starting winding is allowed to remain in circuit after the motor has been brought up to speed, the motor will run inefficiently and the starting winding is liable to over-heat and may burn out. Further, if the main or running winding only is connected to the current supply, the motor will not start and the main winding will draw an excessive current tending to overheat it and burn it out.

An object of the present invention is to provide a single phase motor starter which may be installed at a distance from the motor and in which certain automatic features of operation are provided to insure against the starting winding being inadvertently permitted to remain in circuit after the motor has been started.

Another object of the invention is to provide a single-phase motor starter which is "fool-proof" and cannot be manipulated to connect only the running winding in circuit and allow it to remain in circuit.

Another object of the invention is to render it impossible for any person to manipulate the device to re-connect the starting winding while the motor is running.

A further object of the invention is to guard the motor against injury in case of a temporary failure of the current supply.

Still further, the invention has for an object to provide a motor starting device of simple and sturdy construction which is unlikely to fail in the repeated performance of its intended functions.

In carrying the invention into effect, I provide a switch having independently movable contact elements for the two motor-circuits partially under the control of a manually operated handle or knob so that said elements may both be moved to running position to close circuits through the main and starting windings of the motor. When the operator releases the operating handle or knob, the switch element for the starting winding is automatically returned to "off" position while the switch element for the running winding is maintained in running position, preferably by an electro-magnet designed to release the last-mentioned switch element in case of failure of the current supply. A latch is preferably provided to automatically lock the starting switch element in "off" position and this latch is preferably arranged to be operated automatically to release the starting switch element by the return movement of the running switch element to "off" position.

Stationary brush contacts are arranged to be engaged simultaneously by the movable contacts early in the movement of the latter toward running position, thereby affording a time interval for the motor to pick up speed.

The invention also comprises certain combinations of parts and details of construction to be hereinafter referred to and claimed.

In the accompanying drawings, Fig. 1 is a plan view of a circuit controlling device embodying the invention. Fig. 2 is a section on the line 2—2, Fig. 1, the movable elements being in their respective "off" positions. Fig. 3 is a similar view with the movable elements in their respective "on" or extreme circuit closing positions. Fig. 4 is a similar view, showing one of the movable elements returned to "off" position. Fig. 5 is a disassembled perspective view of the movable elements of the device. Fig. 6 is a longitudinal section through one of the stationary brush contact members which cooperates with the movable members. Fig. 7 is a section through one of the movable contact members. Fig. 8 is a side elevation of the device mounted in operative position beneath a horizontal support, such as the top board of a sewing machine power-table, and Fig. 9 is a diagrammatic view illustrating the device connected to a single phase induction motor.

In the preferred embodiment of the invention, as illustrated, 1 represents a casing within and transversely of which is journaled a shaft 2 having an outboard projection on which is fixed the manually operable handle or knob 3. Fixed to the shaft 2 within the casing 1 is a disk 4, Fig. 5, of moulded insulating material, such as bakelite, in which is peripherally embedded a contact ring divided by radial cuts 5 into a relatively long live segment 6 and a relatively short dead segment 7. Also fixed to the shaft 2 within the casing is an arm 8 which, in the "off" or circuit opening position of the contact element 4, rests against the stop 9 and at times is locked in this position by means of the spring-pressed latch 10 pivoted on the pin 11 in the slotted stud 12 screwed into the side wall of the casing 1. The shaft 2 and parts fixed thereto are constantly urged toward "off" position by any suitable means such as the spiral spring 13 which is secured at one end to the shaft 2 and at its opposite end is anchored to the stud-screw 14 fast to the casing. Loosely mounted on the shaft 2 intermediate the insulating disk 4 and the arm 8 is a sleeve 15 to which is fixed a disk 16, Fig. 5, of insulating material having peripherally embedded therein a contact ring divided by cuts 17 into a relatively long live segment 18 and a relatively short dead segment 19. The disk 16 and segments 18 and 19 on the sleeve 15 are preferably identical with the disk 4 and contact segments 6, 7, on the shaft 2. Fixed to the sleeve 15 is the laminated iron arm 20 which constitutes the armature of the laminated frame of the electro-magnet 21 mounted in the casing 1. A spiral spring 22 similar to the spring 13 is connected at one end to the sleeve 15 and at its opposite end to a stud-screw 23 fast to the magnet-frame 21 and serves to constantly urge the sleeve 15 and parts fixed thereto to "off" or circuit opening position, wherein the arm 20 rests against the arm 8, as shown in Figs. 1 and 2. It will be noted in Fig. 2, that the arm 20 is slightly longer than the arm 8 and that when said arms are resting upon the stop 9, the arm 20 displaces the latch 10 from locking position above the arm 8.

Mounted in suitably insulated brush holding tubes 30 secured to the casing 1 are the brushes 24, 25, 26 and 27, which are preferably made of carbon. The brushes 24 and 26 are electrically connected to the line terminal L', and bear, respectively, on the live segments 6, 18. The brushes 25 and 27 bear, respectively, upon the dead segments 7 and 19 in the "off" positions of the shafts 2 and 15, Figs. 1, 2 and 9. The brush 25 is electrically connected to one terminal of the starting winding S of the motor and the brush 27 is connected to one terminal of the main winding M. The remaining terminals of the windings S and M are electrically connected to the second line terminal L'' by means of the common lead 28 in series with which is the energizing coil 29 of the electro-magnet 21 previously referred to. Each of the brush tubes 30, Fig. 6, is of square cross-section and is set in a square hole in a cylindrical insulating bushing 31 which is held in position in the casing by means of a set-screw 32. Each brush tube 30 is closed at its outer end by a breech plug-screw 33 the threads of which engage complementary threaded portions in the side walls of the square brush-tube; the usual brush-spring 34 being interposed between the brush and plug-screw.

An indicator disk 35 is loosely mounted on the shaft 2 externally of the casing 1 and is connected to turn with the sleeve shaft 15 by means of a pin 36 rigidly mounted on the arm 20 and passing through a semi-circular slot 37 in the front wall of the casing and entering a hole in the indicator-disk 35. The indicator-disk is formed with a pointer 38 which, in conjunction with the legends "off" and "on" marked on the front wall of the casing at positions 180° apart relative to the shaft 2, indicates the position of the main circuit controlling element of the switch.

To operate the device, as when starting a single-phase induction motor, the operator grasps the knob 3 and turns it rather slowly in a clockwise direction as far as it will go, or until the arm 20 engages the poles of the magnet 21, Fig. 3, and then releases the knob. Early in the clockwise movement of the knob the live segments 6, 18, are carried into contact with the respective brushes 25, 27, for simultaneous completion of the starting and main winding circuits. The remainder of the movement gives the motor time to come up to running speed. The running-light current through the magnet coil 29 sufficiently energizes the magnet 21 to automatically hold the arm 20 and main movable circuit controlling element 18 in running or "on" position. Immediately upon release of the knob 3 by the operator, the shaft 2 and parts rigid therewith are automatically returned to "off" position by the spring 13; the arm 8 brushing past the latch 10 and having its motion arrested by the stop 9, Fig. 4. The latch 10 thereupon automatically assumes locking position relative to the arm 8 and prevents manipulation of the knob 3 while the motor is running.

To stop the motor it is merely necessary for the operator to push the pin 39 inwardly against the inclined end 40 of the arm 20 whereupon said arm will be forcibly separated from the holding magnet 21 and will return to "off" position under the influence of the spring 22 and disconnect the main winding. It will be noted that the arm 20, Fig. 2, is slightly longer than the arm 8 and displaces the latch 10 from holding engagement with the arm 8, thereby unlocking the parts for subsequent operation.

In case of a temporary failure of current supply, the magnet 21 operates as a no-voltage release for the arm 20 and the motor will be automatically cut out of circuit, thereby avoiding the danger of burning out the main winding when the current supply is restored.

The present device is substantially "foolproof" inasmuch as both the starting and running winding circuits are completed early in the turning movement of the knob 3 and will both be broken automatically if said knob is released before it has been turned as far as it will go. It is impossible to so manipulate the device as to complete the running winding circuit without at the same time completing the starting winding circuit. The completion of both circuits early in the turning movement of the knob 3 and the necessity of turning the knob 3 all the way to "on" position to secure maintenance of the running winding circuit after the knob is released, affords a time interval for the motor to pick up speed. The wiping or brush contacts between the movable and stationary contact elements are of a character insuring long life and efficient service over long periods without attention.

Having thus set forth the nature of the invention, what I claim herein is:—

1. A two-circuit switch comprising, a casing, independently movable contact members, stationary contact means, manual means for moving said movable contact members to "on" position, spring means for returning said movable contact members to "off" position, means for releasably retaining one of said movable contact members in "on" position, and a latch mounted on said casing independently of said manual means for locking the other movable contact member in "off" position.

2. A two-circuit switch comprising, a casing, independently movable contact members, stationary contact means, manual means for moving said movable contact members to "on" position, spring means for returning said movable contact members to "off" position, means for releasably retaining one of said movable contact members in "on" position, a latch mounted on said casing independently of said manual means for locking the other movable contact member in "off" position, and means moving with said one of said movable contact members for releasing said latch.

3. A two-circuit switch comprising, a casing, independently movable coaxial shafts journaled in said casing, contact members carried by said shafts, stationary contacts, manual means mounted on one of said shafts for turning said shaft to carry its contact member to "on" position, an arm fixed to said one of said shafts for moving the other contact member to "on" position, means for automatically returning said arm and its shaft to "off" position, and a spring-latch for engaging said arm and locking it and its shaft in "off" position.

4. A two-circuit switch comprising a casing, a shaft in said casing, an arm and contact member fixed on said shaft, a sleeve loose on said shaft, an arm and contact member fixed on said sleeve, the arm of said shaft being adapted to engage and move the other arm, manually operated means mounted on said shaft externally of said casing, means for holding the sleeve arm in "on" position, and means for automatically returning the shaft and parts fixed thereto to "off" position.

5. A two-circuit switch comprising a casing, a shaft in said casing, an arm and contact member fixed on said shaft, a sleeve loose on said shaft, and arm and contact member fixed on said sleeve, the arm of said shaft being adapted to engage and move the other arm, manually operated means mounted on said shaft externally of said casing, means for holding the sleeve arm in "on" position, means for automatically returning the shaft and parts fixed thereto to "off" position, and automatic means for locking said shaft and parts in "off" position.

6. A two-circuit switch comprising, two independently movable contact ring segments, means for simultaneously moving said ring segments to "on" position, stationary brush contacts so located as to be engaged by said movable contact ring segments early in their movement to "on" position, spring means for returning said ring segments to "off" position, and releasable means independent of said contacts for holding one of said ring segments in "on" position.

7. A two-circuit switch comprising, two independently and coaxially movable contact members having concentric curved contact surfaces, means for simultaneously moving said members to "on" position, stationary brush contacts so located as to be engaged by said contact members early in their movement to "on" position, spring means for moving said members to "off" position, and a no-voltage release magnet for holding one only of said members in "on" position.

8. A switch comprising a casing, a shaft in said casing, an insulated contact ring mounted on said shaft and formed with a relatively long live segment and a relatively short dead segment, a pair of spaced brushes arranged to bear respectively on said segments in the "off" position of said shaft, manually operated means for moving said shaft to "on' position wherein said live segment bridges the space between said brushes, means tending to return said shaft to "off" position, releasable means for holding said shaft in "on" position.

9. A two-circuit switch comprising, a casing, a shaft journaled in said casing, a handle on said shaft exteriorly of said casing, a pair of insulated circular contact rings coaxial with said shaft within said casing, said rings being radially slotted to divide them into insulated segments, a pair of live contact brushes bearing, respectively, on a segment of each ring, and a second pair of brushes bearing, respectively, on another segment of each ring when said shaft is in "off" position, and means whereby said rings are rotated to substantially simultaneously complete the circuits from each live brush to a corresponding brush brush of said second pair, and whereby one of said circuits is subsequently opened.

In testimony whereof, I have signed my name to this specification.

FREDERICK DIEHL.